(12) United States Patent
Schimpe

(10) Patent No.: US 12,485,764 B2
(45) Date of Patent: Dec. 2, 2025

(54) METHOD FOR DISCHARGING AT LEAST ONE BATTERY CELL OF A BATTERY AND CONTROL DEVICE

(71) Applicant: AUDI AG, Ingolstadt (DE)

(72) Inventor: Michael Schimpe, Munich (DE)

(73) Assignee: AUDI AG, Ingolstadt (DE)

( * ) Notice: Subject to any disclaimer, the term of this patent is extended or adjusted under 35 U.S.C. 154(b) by 709 days.

(21) Appl. No.: 17/950,257

(22) Filed: Sep. 22, 2022

(65) Prior Publication Data

US 2023/0088976 A1    Mar. 23, 2023

(30) Foreign Application Priority Data

Sep. 22, 2021  (DE) .......................... 102021124474.9

(51) Int. Cl.
| | |
|---|---|
| *H01M 10/44* | (2006.01) |
| *B60L 3/04* | (2006.01) |
| *B60L 50/60* | (2019.01) |
| *B60L 55/00* | (2019.01) |
| *B60L 58/10* | (2019.01) |
| *H01M 10/46* | (2006.01) |
| *H02J 7/00* | (2006.01) |

(52) U.S. Cl.
CPC ................. *B60L 3/04* (2013.01); *B60L 50/60* (2019.02); *B60L 55/00* (2019.02); *B60L 58/10* (2019.02); *H02J 7/0013* (2013.01); *H02J 7/0029* (2013.01); *H02J 7/0063* (2013.01); *H02J 7/007192* (2020.01)

(58) Field of Classification Search
CPC ... H02J 7/0029; H02J 7/007192; H02J 7/0013
USPC ................. 320/107, 116, 135, 136, 150, 153
See application file for complete search history.

(56) References Cited

U.S. PATENT DOCUMENTS

| | | | |
|---|---|---|---|
| 11,239,671 B2 * | 2/2022 | Yamaguchi | ......... H02J 7/00306 |
| 2015/0051771 A1 | 2/2015 | Greenwood et al. | |

FOREIGN PATENT DOCUMENTS

| | | |
|---|---|---|
| DE | 102008010980 A1 | 8/2009 |
| DE | 102012020019 A1 | 4/2014 |
| DE | 102012221133 A1 | 5/2014 |
| DE | 102016224002 A1 | 6/2018 |
| DE | 102018127053 A1 | 4/2020 |
| DE | 102019218333 A1 | 5/2021 |
| WO | 2013106368 A2 | 7/2013 |

OTHER PUBLICATIONS

Machine translate of DE102008010980A1 (Aug. 28, 2009) (Year: 2009).*

(Continued)

*Primary Examiner* — Edward Tso
(74) *Attorney, Agent, or Firm* — Maier & Maier, PLLC

(57) ABSTRACT

A method for discharging at least one battery cell of a battery for a motor vehicle in the event of at least one specific detected fault concerning the battery. The specific fault is detected and, depending on the detection of the fault, an emergency discharge process for at least partially discharging the at least a battery cell is initiated. In doing so, the at least one battery cell is at least partially discharged during the emergency discharge process via at least one on-board electrical consumer of the motor vehicle external to the battery and/or a power supply system external to the motor vehicle.

15 Claims, 3 Drawing Sheets

(56) References Cited

OTHER PUBLICATIONS

German Search Report issued on Sep. 15, 2022, in connection with corresponding German Application No. 102021124474.9 (14 pp., including machine-generated English translation).

* cited by examiner

METHOD FOR DISCHARGING AT LEAST ONE BATTERY CELL OF A BATTERY AND CONTROL DEVICE

FIELD

The invention relates to a method for discharging at least one battery cell of a battery for a motor vehicle in the event of at least one specific detected fault concerning the battery, wherein the specific fault is detected and, depending on the detection of the fault, an emergency discharge process for at least partially discharging the at least a battery cell is initiated. Furthermore, the invention also relates to a control device for controlling a discharging of at least one battery cell of a battery.

BACKGROUND

Battery cells, for example lithium-ion cells in motor vehicles or stationary battery storage systems, can become defective as a result of damage, for example in the event of an overload or in the event of external damage, or as a result of production errors, for example due to contamination. The fault can lead to a thermal runaway of the cell, which can result in fire, smoke and high temperatures. If a thermal runaway of such a battery cell occurs, this is associated with a rapid rise in temperature. Such faults in battery cells can be recognized by suitable sensors. The higher the state of charge of the battery in the event of a thermal runaway of battery cells, the higher the energy in the system and the more severe the reaction, e.g. fire and so on, in the event of a thermal runaway. Cells adjacent to a faulty cell can also be activated by the violent reaction and the entire battery pack will burn out. Typically, when such a fault is recognized in the battery, the vehicle is prevented from starting, the vehicle is shut down, and the driver is warned. The battery may still be fully charged at this point and the energy content is therefore high. The thermal reaction in the cell is correspondingly strong. The fault in a cell may lead to thermal runaway in the cell and possibly also in the entire high-voltage battery. Accordingly, it would be desirable if the energy content of the battery system could be reduced as efficiently as possible in the event of such a fault.

WO 2013/106368 A2 describes a system for discharging battery packs in vehicles by means of a battery discharge device which is designed to be electrically coupled to the battery via appropriate connections. These connections may be provided through service disconnect switch connections. Such a service disconnect switch can be removed accordingly and the discharge device can be connected instead. This process can be performed manually. Alternatively, the motor vehicle itself can also comprise the discharge device, which can be automatically coupled to the battery in the event that an accident is detected, in order to discharge it.

However, manual connection from the outside in an emergency is very cumbersome and not always possible. A lot of time has already passed before the motor vehicle has accordingly visited a workshop in order to connect such a discharge device. In addition, in case of such a fault, such as the detection of an incipient thermal event, the motor vehicle can often no longer be moved at all, as already described above. On the other hand, integration into a motor vehicle requires additional installation space and, above all, a suitable heat dissipation option, since an extremely large amount of heat is released via a resistor when discharging an entire high-voltage battery.

Furthermore, US 2015/0051771 A1 describes the possibility of discharging individual battery cells via the balancing circuit built into the battery. For this purpose, for example, appropriate balancing resistors can be connected in parallel to a respective battery cell to be discharged.

Such resistors or, in general, balancing circuits are often only designed for small currents, since battery cells usually only have to convert small amounts of energy into heat via the resistors for balancing, i.e. charge equalization. If one wanted to completely discharge corresponding battery cells via such a balancing circuit, this would either take an enormous amount of time or, on the other hand, result in a significantly more complex and robust design of such a balancing circuit, which in turn negates the advantage of using already existing components for discharging the battery cells.

SUMMARY

The object of the present invention is therefore to provide a method and a control device that make it possible to discharge at least one battery cell of a battery in the event of a specific detected fault as easily as possible and at the same time as efficiently as possible. In a method according to the invention for discharging at least one battery cell of a battery for a motor vehicle in the event of at least one specific detected fault concerning the battery, the specific fault is detected and, depending on the detection of the fault, an emergency discharge process for at least partially discharging the at least a battery cell is initiated. In doing so, the at least one battery cell is at least partially discharged during the emergency discharge process via at least one on-board electrical consumer of the motor vehicle external to the battery and/or a power supply system external to the motor vehicle.

In doing so, the invention is based on the knowledge that the use of an on-board electrical consumer external to the battery and/or a power supply system external to the vehicle for discharging the at least one battery cell as part of an emergency discharge process can provide significantly higher discharge capacities and at the same time reduce the structural measures for implementing the emergency discharge process to a minimum, at least on the motor vehicle side. In particular, this can be implemented in a particularly simple, efficient and cost-effective manner on the motor vehicle side, since existing on-board electrical consumers can be used to discharge the at least one battery cell, which are present anyway, and via which significantly higher discharge capacities than, for example, by a balancing circuit or something similar, can be provided as well. To give an example, a conventional high-voltage heater in a motor vehicle typically has a capacity of 7 kilowatts to 8 kilowatts. This means that an average high-voltage battery can be completely discharged in just a few hours, for example twelve hours, if it has been fully charged beforehand. A fully charged battery can then correspondingly be brought to a charge level of 50 percent or below in just six hours, for example. The same also applies to the use of a power supply system external to the motor vehicle for discharging the at least one battery cell. Advantageously, even higher discharge capacities can be realized here. In particular, the same discharge capacities can be used to discharge the at least one battery cell, for example, as can also be provided for charging the battery in the normal operating state. A wall box, for example, provides a charging capacity of 11 kilowatts, a charging station, in particular a fast charging station, for example, has significantly higher charging capacities. If the motor vehicle and/or such a device external to the motor vehicle for coupling to the power supply system external to the motor vehicle, such as a charging column, is designed for bidirectional charging, the at least one battery cell of the battery can be discharged with the same or similar discharge capacity as can also be used to charge the battery. If the motor vehicle is, for example, coupled to such a power supply system external to the motor vehicle when the specific fault is detected, the emergency discharge process can advantageously be carried out by discharging the at least one battery cell via this power supply system in an extremely simple and quick manner. The heat generated by the discharging process can also be dissipated in a particularly simple manner. Both on-board electrical consumers and, for example, charging stations or wall boxes are already designed according to their capacities and some have their own cooling devices or cooling options and are positioned such that the environment is not endangered by the resulting heat. Advantageously, no additional cooling measures or insulation measures or the like have to be provided in either case. Feeding the discharged energy into a power supply system also avoids the destruction of a large part of the energy by converting it into heat. As a result, less heat is generated and most of the discharged energy remains usable. Overall, the invention therefore enables an emergency discharge process to be implemented in a particularly simple and efficient manner. Thus, overall, both the damage in the event of thermal runaway and the risk of thermal runaway itself can be minimized.

The at least partial discharging of the at least one battery cell via an on-board electrical consumer can also comprise discharging the at least one battery cell via a charger of the motor vehicle by feeding it into the power supply system. However, at least partial discharging of the at least one battery cell via an on-board electrical consumer is preferably understood to mean that this on-board electrical consumer itself consumes at least the majority, preferably almost the full, i.e. apart from other unavoidable energy losses, energy drawn from the at least one battery cell during discharging, in particular through the active operation of the respective on-board electrical consumer. For this purpose, it can be provided for the on-board electrical consumer to be activated to provide the emergency discharge process, even if it is not currently required. In the context of the present invention, discharging the at least one battery cell should not necessarily imply complete discharging of the battery module, but it should also always be understood to mean only partial discharging of the at least one battery cell. The battery cell can also be part of a battery module that is being discharged. At least partial discharging of a battery module is also understood to mean at least partial discharging of all of the cells comprised by this battery module, either simultaneously and/or sequentially in time. The at least one battery cell can be, for example, a lithium-ion cell as mentioned at the beginning. It is preferably part of a battery configured as a high-voltage battery, in particular for a motor vehicle. The battery can therefore be configured as a traction battery for the motor vehicle. Such a high-voltage battery can generally comprise numerous battery cells, which can optionally also be combined to battery modules. Correspondingly, the battery can comprise several battery modules, each of which comprise several battery cells. Accordingly, the method is preferably used in an electric or hybrid vehicle. The specific detected fault concerning the battery is preferably a defect in at least one of the battery cells of the battery, in particular the beginning of a thermal runaway of such a battery cell or a defect that causes such a thermal runaway. The battery cell to be discharged and the battery cell that has the defect do not necessarily have to represent the same battery cell, but they can. Such a fault can be recognized by sensors and/or algorithms. Exemplary methods are the recognition by a voltage drop, for example an individual cell voltage or a module voltage or the overall battery voltage, a recognition of a drop in insulation resistance and/or a recognition of an increase in the battery temperature or the battery module temperature or a cell temperature. Depending on the situation, it can take minutes or even several hours between the recognition or detection of such a fault and a possible thermal runaway. In the meantime, the battery cells may still be functional. In particular the battery cells that do not trigger the fault or are not affected by this defect are still functional. Accordingly, this time up to thermal runaway can now advantageously be used to at least partially discharge the at least one battery cell of the battery. As a result, the energy content of the battery can consequently be reduced and the consequences of thermal runaway can be reduced in magnitude. As a result, the overall risk from a thermal runaway can be minimized.

As already mentioned above, it is not necessary for the at least one battery cell to be completely discharged or deeply discharged, which can nevertheless be the case. However, it is also conceivable that the at least one battery cell is only discharged during the emergency discharge process until it reaches or falls below a specific minimum charge threshold value. The discharge time can be shortened in this way and the extent of a thermal runaway can still be significantly reduced. In doing so, the minimum threshold value can correspond, for example, to a state of charge of at most 50 percent or less, e.g. 35 percent or less.

In principle, not only one battery cell can be discharged within the context of the emergency discharge process, but possibly several as well, as will be explained in more detail later. In addition, it is also conceivable that not only one on-board electrical consumer is used for discharging the battery cell, but also, for example, several on-board electrical consumers simultaneously or overlapping in time or also one after the other. In addition, discharging via a power supply system external to the motor vehicle can also be at least partially accompanied by discharging via at least one on-board electrical consumer external to the battery, or can precede it or follow it. Both variants can also be combined with each other in any way or selected depending on availability. For example, if the motor vehicle is currently, i.e. at the time the specific fault is detected, not or cannot be coupled to a power supply system external to the motor vehicle, the emergency discharge process can, for example, be carried out via the at least one on-board electrical consumer external to the battery. Otherwise, the power supply system external to the motor vehicle can be used for discharging in addition or as an alternative.

In principle, the on-board electrical consumer external to the battery can be any auxiliary consumer of a conventional motor vehicle, in particular an electric vehicle. In this case, the on-board electrical consumer can represent both an auxiliary consumer of a low-voltage on-board electrical system of the motor vehicle and/or also an auxiliary consumer of the high-voltage electrical system. The latter is preferred, since this typically allows significantly higher discharge capacities to be provided. Accordingly, it represents an advantageous embodiment of the invention when the on-board electrical consumer is a high-voltage consumer of a high-voltage on-board electrical system of the motor vehicle, which is operated in an active state to discharge the at least one battery cell, in particular with a maximum operating capacity assigned to the high-voltage consumer. As a rule, very high capacities can be provided precisely by high-voltage consumers, which can be used for a very rapid discharging of the at least one battery cell. If the relevant high-voltage consumer is not active at the time the fault is detected, it can be activated for the purpose of performing the emergency discharge. If it is already active, it can continue to be operated in its active state. If the high-voltage consumer can be operated at different capacity levels, for example, it is also advantageous if the high-voltage consumer is operated at its maximum capacity level to perform the emergency discharge process, so that the emergency discharge process can advantageously be performed as quickly as possible.

In a further particularly advantageous embodiment of the invention, the high-voltage consumer represents an air conditioning device of the motor vehicle, in particular an electric air conditioning compressor, and/or a heating device, in particular at least one high-voltage heater. These air conditioning and heating components typically have a particularly high consumption and can therefore be used in a particularly efficient manner for discharging the at least one battery cell as quickly as possible. As already mentioned above, a high-voltage heater has capacities in the range between 7 and 8 kilowatts, for example. Other high-voltage consumers, such as the electric air conditioning compressor, are also in a similar capacity range. If several auxiliary consumers are used simultaneously to discharge the at least one battery cell, the capacity can be additionally increased as a result. Other consumers can also be activated for the purpose of emergency discharge, for example seat heating or steering wheel heating or window heating or mirror heating. It is also conceivable to operate the electric machine in idle mode or to feed energy into the low-voltage on-board electrical system, for example into a low-voltage battery.

In a further advantageous embodiment of the invention, before the emergency discharge process, it is checked whether a charger on the motor vehicle side is coupled to the power supply system, and if the charger is coupled to the power supply system, the charging process is carried out in such a way or by at least partially discharging the at least one battery cell by means of the charger by feeding battery current into the power supply system. Accordingly, a bidirectional charging functionality can be used to feed into the power supply system. It can be provided on the motor vehicle side, e.g. by the charger on the motor vehicle side, or also by a correspondingly designed charging column or charging station or wall box. In both cases, energy can advantageously be fed from the battery into such a power supply system in the shortest time. This in turn is based on the knowledge that defects described above also often occur in connection with a charging process for charging the battery. If such a defect is detected, for example, when the motor vehicle is currently connected to the power supply system for the purpose of charging the battery, the charging process can advantageously be interrupted and the feeding process can be triggered in order to discharge the at least one battery cell during the emergency discharge.

It is particularly advantageous if the battery current is fed into the power supply system by means of a charging station connected to the power supply system, in particular a charging column, or a wall box to which the charger on the motor vehicle side is coupled. Such a charging station or charging column or wall box can usually provide significantly higher charging capacities and correspondingly also discharging capacities than is possible, for example, by coupling the charger of the motor vehicle to a household socket. Nevertheless, this would also be conceivable or usable for discharging the at least one battery cell. Another advantage of connecting the charger on the motor vehicle side to a charging station or wall box, for example via a conventional charging cable, is that the bidirectional charging functionality, which is used to discharge the battery by feeding current into the relevant power supply system, does not necessarily have to be provided by the charger on the motor vehicle side itself, but alternatively or additionally also by a corresponding charger assigned to the charging station or wall box. If, for example, the motor vehicle itself does not have a correspondingly designed charger, such bidirectional charging can still be used to discharge the at least one battery cell if the corresponding device external to the motor vehicle, namely the charging station or wall box, is configured accordingly, i.e. as a bidirectional charging column or bidirectional wall box. Accordingly, it is also advantageous in this context if the charger on the motor vehicle side and/or the charging station or the wall box is configured for bidirectional charging. On the other hand, if this bidirectional charging functionality is integrated into the charger on the motor vehicle side, feeding into a power supply system can always be used to perform the emergency discharge process, regardless of whether the correspondingly used charging station or wall box or also the house network connection are specially designed or not.

Furthermore, it is particularly advantageous if the discharge takes place with a discharge capacity of at least 5 kilowatts, in particular at least 7 kilowatts. This has the advantages already described above of discharging the at least one battery cell as quickly as possible. Above all, if more than just one battery cell, in particular the entire battery, is to be discharged, at least in part, this can be realized in a particularly quick manner through such high discharge capacities. This is made possible by the use of on-board electrical consumers and/or a power supply system external to the motor vehicle for discharging the at least one battery cell, since such high charging or discharge capacities can be provided by such devices, as also already described above. In particular, such a high discharge capacity can also be provided by just one on-board electrical consumer or by discharging into the power supply system external to the motor vehicle alone. If several on-board electrical consumers or discharge options are used in combination, significantly higher discharge capacities can be achieved overall, in particular multiples of the individual discharge capacity mentioned above.

In a further advantageous embodiment of the invention, an ambient parameter is captured, in particular a temperature, e.g. an ambient temperature, and/or a parameter that indicates whether the motor vehicle is currently in a closed or partially closed interior, and the emergency discharge process is carried out depending on the captured ambient parameter. As also already mentioned, the discharge process may result in a very large amount of heat to be dissipated. Especially when the high-voltage heater is used to discharge the at least one battery cell, very high temperatures can develop inside the vehicle and around the vehicle. Accordingly, it is advantageous if the vehicle is then, for example, not parked in a closed space, such as a garage. If this is nevertheless the case, the emergency discharge process can now as a result of this design advantageously be carried out in an appropriately adapted manner, or also be aborted or not initiated at all. For example, it is also conceivable that the emergency discharge process is performed with a reduced discharge capacity and, for example, the corresponding on-board electrical consumer is not operated with its maximum assigned capacity, but only with reduced capacity, for example. It is also conceivable to only reduce the discharge capacity when an ambient temperature, for example in the immediate vicinity of the motor vehicle or also in the motor vehicle interior, exceeds a specific threshold value. In this way, even more safety can be ensured during the execution of the emergency discharge process, especially with regard to the current vicinity of the motor vehicle.

A temperature sensor of the motor vehicle can be used to capture the ambient parameter and/or for example also a motor vehicle camera or other surroundings sensors for the detection and classification of motor vehicle surroundings. The fact that the motor vehicle is currently parked in a garage, for example at home, can also be determined, for example, using GPS coordinates of the motor vehicle or other known localization options.

In a further advantageous embodiment of the invention, the battery has several battery cells, wherein only a part of all the battery cells comprised by the battery is at least partially discharged during the emergency discharge process, in particular only a first battery cell causing the fault, and/or at least one battery cell arranged spatially adjacent to the first battery cell, in particular also all battery cells arranged spatially adjacent to the first battery cell, and/or only the battery cells of a first battery module which comprises the first battery cell, and/or at least one or more battery modules arranged adjacent to the first battery module. In the present example, the battery cell that has the defect is referred to as the first battery cell, and the battery module that comprises the first battery cell is referred to as the first battery module. All other cells or modules can then correspondingly be referred to as second cells or second modules. With this advantageous embodiment of the invention, the source of danger can be significantly defused, at least locally, and at the same time the discharge times can be significantly reduced as a result, since not the entire battery has to be discharged. If, for example, the corresponding defective cell, i.e. the first battery cell, and its local spatial environment, i.e. the other second battery cells and/or second battery modules surrounding this defective battery cell, is discharged, a thermal event cannot easily spread to other adjacent cells or cell modules. A thermal propagation can even be interrupted as a result.

Alternatively, it is also possible, as is provided according to a further advantageous embodiment of the invention, for the battery to have several battery cells, wherein all of the battery cells comprised by the battery are at least partially discharged during the emergency discharge process. Precisely due to the discharge options described above, through which very high discharge capacities can be provided, discharging the entire battery is at least partially possible within a short time, so that the risk potential of the battery as a whole can be reduced to a minimum. A time-sequential discharging of the individual cells or battery modules in a predetermined order, for example starting from the defective first cell or the defective first battery module, is also conceivable. For example, the first battery module with the affected defective first cell can be discharged first, then the second battery modules adjacent to it, and so on. In principle, discharging should also always be understood to mean only partial discharging of the corresponding battery cells or modules, for example down to a predetermined minimum state of charge threshold value. In principle, it can also be selected differently for the different battery modules. For example, the affected cell or the affected battery module that has the defect can be discharged to a lower state of charge than the battery modules that are far away from them. In this way, those cells from which a higher risk potential emanates due to the defect can be discharged to a lower state of charge in a targeted manner, as a result of which their risk potential is correspondingly reduced.

In principle, it is therefore conceivable for the entire battery system to be discharged, as well as for only individual parts of the battery system to be discharged, such as the defective cell or cells directly adjacent to the defective cell.

Parts of the battery system can be discharged, for example, by using switching elements in the battery system. Suitable circuits are sufficiently known to a person skilled in the art.

Furthermore, the invention relates to a control device for a battery for controlling the discharging of at least one battery cell of the battery in the event of at least one specific detected fault concerning the battery, wherein the control device is designed to trigger an emergency discharge process for at least partially discharging the least one battery cell depending on the detection of the fault. Furthermore, the control device is designed to trigger such an emergency discharge process, in particular to perform it, in which the at least one battery cell is at least partially discharged during the emergency discharge process via at least one on-board electrical consumer external to the battery and/or a power supply system external to the motor vehicle.

The advantages described for the method according to the invention and its embodiments thus apply similarly to the control device according to the invention.

The control device can have a data processing device or a processor device which is set up to perform an embodiment of the method according to the invention. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is set up to carry out the embodiment of the method according to the invention when executed by the processor device. The program code can be stored in a data memory of the processor device.

The invention also includes further developments of the control device according to the invention, which have features as have already been described in connection with the further developments of the method according to the invention. For this reason, the corresponding further developments of the control device according to the invention are not described again here.

Furthermore, a battery with such a control device should also be regarded as belonging to the invention. The battery can also be configured as described above. In addition, the battery can also comprise a suitable detection device for detecting the fault, as has also been described above. An on-board electrical system of the motor vehicle and a motor vehicle with a battery according to the invention or one of its embodiments should also be regarded as belonging to the invention.

The motor vehicle according to the invention is preferably embodied as an automobile, in particular as a passenger car or truck, or as a passenger bus or motorcycle.

The invention also comprises combinations of the features of the described embodiments. The invention also comprises implementations that each have a combination of the features of several of the described embodiments, provided that the embodiments were not described as mutually exclusive.

BRIEF DESCRIPTION OF THE FIGURES

Exemplary embodiments of the invention are described hereinafter. In the figures.

DETAILED DESCRIPTION

Figure 1:
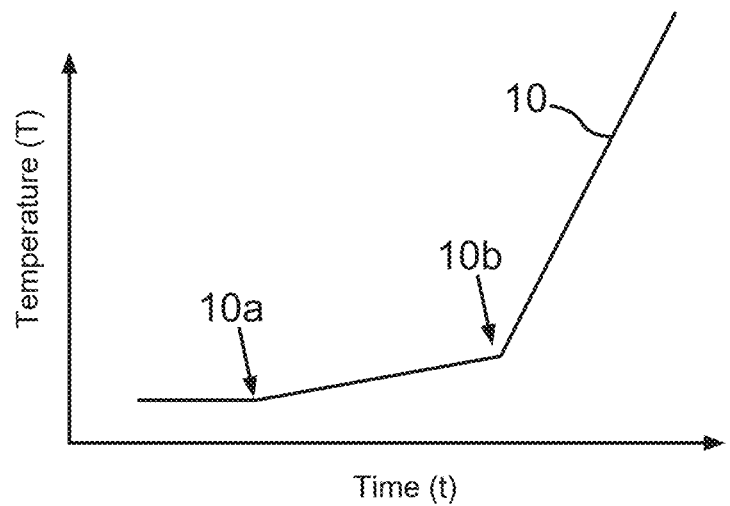
FIG. 1 shows a graphic representation of the time course of the cell temperature in the case of a cell defect up to thermal runaway.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further ones of the above-described features of the invention.

In the figures, the same reference numerals designate elements that have the same function.

FIG. 1 shows a graphic illustration of the course 10 of the temperature T of a battery cell in the event of a defect up to thermal runaway as a function of the time t. At point 10a on curve 10, a defect of the cell occurs and at point 10b on curve 10, thermal runaway of the cell begins. As can be seen from FIG. 1, there is a time delay between the occurrence of the defect 10a and the thermal runaway 10b of the cell. In the meantime, the battery cells, even those affected by such a defect, are often still functional. Correspondingly, there can be minutes, but also several hours, between the recognition of the fault and a possible thermal runaway.

Figure 2:
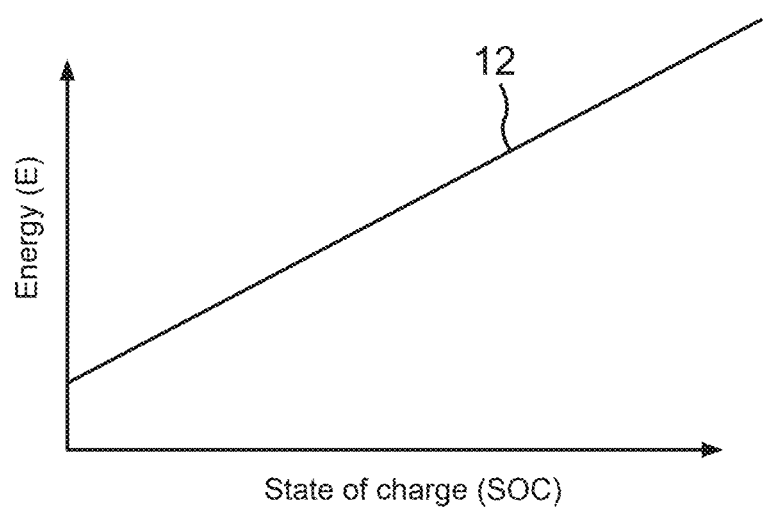
FIG. 2 shows a graphic illustration of the relationship between the state of charge of a battery cell and the released energy of the cell in thermal runaway.

FIG. 2 shows a graphic illustration of the relationship between the state of charge SOC of a battery cell and the released energy E of the cell in thermal runaway using the represented curve 12. As can be seen, there is a linear, directly proportional relationship between the state of charge SOC of the cell and the released energy E. The higher the state of charge SOC of a cell or the entire battery of a motor vehicle, the higher the energy in the system and correspondingly the energy E that can be released in the event of a thermal runaway. Accordingly, when the battery is fully charged, the reaction as a result of a thermal runaway, i.e. fire and so on, is correspondingly more violent.

According to the invention, the risk potential in the event of a defect of a cell of a battery of the motor vehicle can now advantageously be significantly reduced in a particularly efficient manner. This will now be explained in more detail below.

Figure 3:
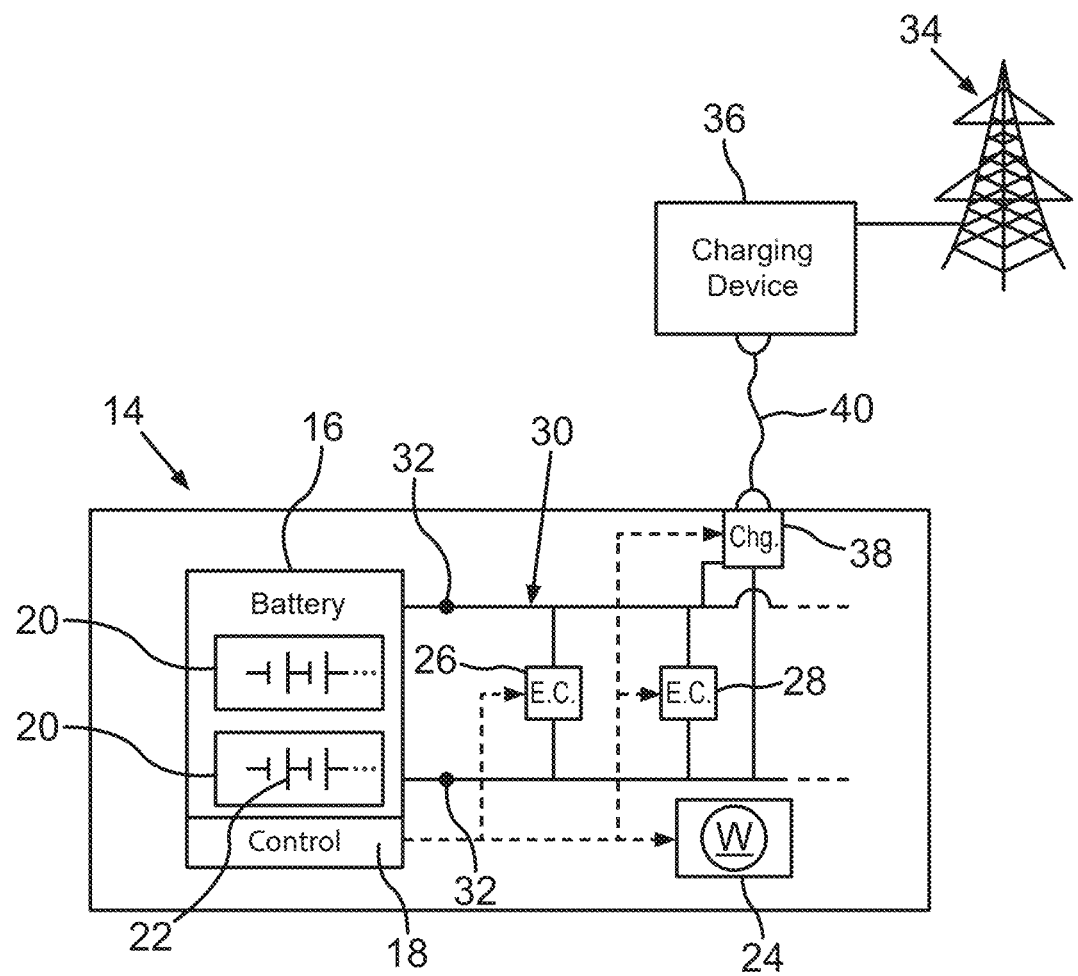
FIG. 3 shows a schematic representation of a motor vehicle with a battery and a control device for controlling the discharging of at least one battery cell in the course of an emergency discharge process according to an exemplary embodiment of the invention.

FIG. 3 shows a schematic representation of a motor vehicle 14 with a battery 16 configured as a high-voltage battery 16 and a control device 18 for controlling the discharging of the battery 16 or at least parts thereof according to an exemplary embodiment of the invention. The battery 16 can furthermore comprise several battery modules 20 each with several battery cells 22, of which only one is provided with a reference numeral here as an example. The control device 18 can be configured as a battery control unit, for example. This can also be coupled to or configured with suitable sensors, not explicitly shown here, for recognizing a defect of the battery 16, in particular a defect of a battery cell 22. If such a fault is detected by the control device 18, a warning W can be output to a driver of the motor vehicle 14, for example via a suitable display device 24 of the motor vehicle or another suitable output device. Such a warning W can be output at least if the motor vehicle 14 is in the active state, being driven or being used by a driver, at the time the fault state is detected. Otherwise, the output of the warning W can be dispensed with or a warning message can be sent to the user or owner of the vehicle 14 in some other way, for example to his or her mobile smartphone. If the motor vehicle 14 is in the active state at the time the fault is detected, for example while driving, the vehicle can request the driver to stop or automatically initiate an emergency stop process and in particular block the readiness to drive. Other measures are also conceivable.

In order to limit the damage caused by the detected defect as a preventive measure, the energy content of the battery 16 can now also be actively reduced. There are several different ways to do this. For example, the battery 16 or at least parts thereof, for example the affected battery cell 22 or the affected battery module 20, are discharged by consumers 26, 28 inside the vehicle. Two high-voltage consumers 26, 28, i.e. auxiliary consumers of a high-voltage on-board electrical system 30 of the motor vehicle 14, are shown as such, for example, consumers 26, 28 inside the vehicle that can be used for this purpose, which are coupled to or can be coupled to battery connections 32 of the high-voltage battery 16, for example via high-voltage contactors not explicitly represented here. Such high-voltage consumers 26, 28 can, for example, be an interior air-conditioning device 26, for example an electric air-conditioning compressor 26, and/or represent a heater 28, in particular a high-voltage heater. This allows a particularly high discharge capacity for discharging the battery 16 and/or individual battery cells 22 to be provided. This allows the battery 16 or its battery cells 22 to be discharged particularly quickly. If the corresponding consumers 26, 28 are inactive at the time the fault is detected, they can be activated and, in particular, if possible, set to the highest capacity level assigned to them.

A further discharging option for discharging the at least one battery cell 22 of the battery 16 also consists in implementing this emergency discharge process via a power supply system 34 external to the motor vehicle. The motor vehicle 14 can be coupled to such a power supply system 34 in particular via a charging device 36 external to the vehicle, for example a charging column or a wall box. For charging the battery 16 in the normal operating state, the motor vehicle 14 usually has a charger 38 which, in particular, also represents a high-voltage consumer of the high-voltage on-board electrical system 30. This charger 36 can, for example, be coupled or will be coupled to such a charging device 36 via a suitable charging cable 40. The charger 38 and/or the charging device 36 can be configured for bidirectional charging. This advantageously makes it possible to feed energy from the battery 16 via the charger 38 into the charging device 36 and via this into the power supply system 34. The battery 16 can also be discharged in a particularly efficient and, above all, quick manner in this way. The emergency discharge process can be triggered and controlled by the control device 18, in particular by transmitting control signals to the corresponding components involved, for example the display device 24 and the on-board electrical consumers 26, 28, 38, including the charger 38, as illustrated by the dashed arrows in FIG. 3.

The battery 16 can thus be discharged before thermal runaway and the energy content can be significantly reduced and the risk can thus be minimized. The entire battery system 16, i.e. all battery cells 22 comprised by the battery 16, can also be discharged, or only individual parts of the battery system 16, for example only the faulty cell 22 or cells 22 directly adjacent to the faulty cell 22.

Figure 4:
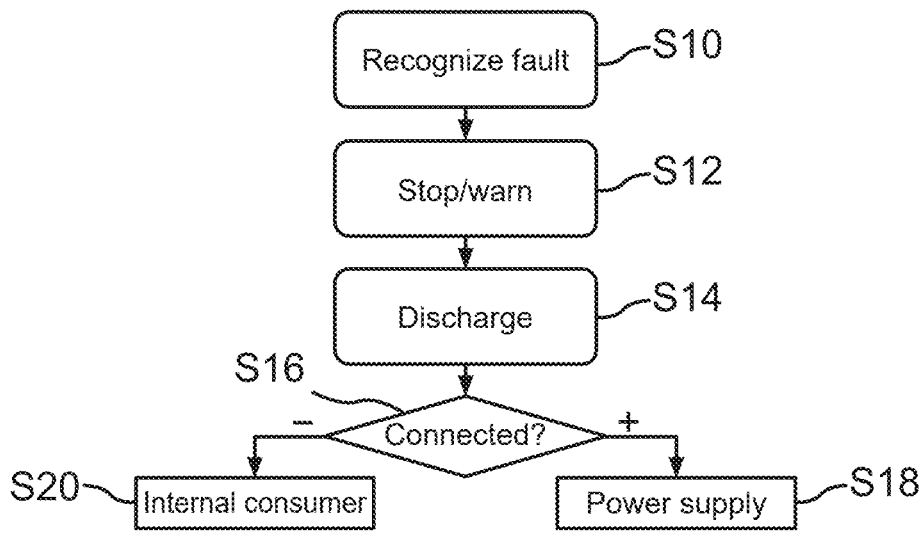
FIG. 4 shows a schematic representation of a flowchart to illustrate a method for discharging at least one battery cell according to an exemplary embodiment of the invention.

FIG. 4 shows a schematic representation of a flowchart to illustrate a method for discharging at least one battery cell 22 as part of an emergency discharge process according to an exemplary embodiment of the invention. The method starts with step S10, in which the fault in the battery 16 is recognized. Then, in step S12, the vehicle 14 is optionally stopped and locked and the driver is warned. Furthermore, in step S14 the discharge routine for discharging the at least one battery cell 22 is initiated by the control device 18. In the course of executing this discharge routine, the control device 18 can, for example, first check in step S16 whether the vehicle 14 is currently coupled to a power supply system 34 external to the vehicle, for example via a charging station 36. If this is the case, control device 18 can initiate the emergency discharge process for discharging the at least one battery cell 22, for example by suitably activating the control unit 38, in the course of which the at least one battery cell 22 is discharged by feeding battery current into the power supply system 34. Optionally, in this case, a discharge can also be implemented via another on-board electrical consumer 26, 28. If the motor vehicle 14 is not currently connected to a power supply system 34 external to the vehicle, a transition can be made to step S20, in which the emergency discharge process is carried out via a consumer 26, 28 internal to the vehicle, in particular an auxiliary consumer of the high-voltage on-board electrical system 30, in which it consumes the energy which leads to the discharge of the corresponding at least one cell 22 as part of the emergency discharge process.

Figure 5:
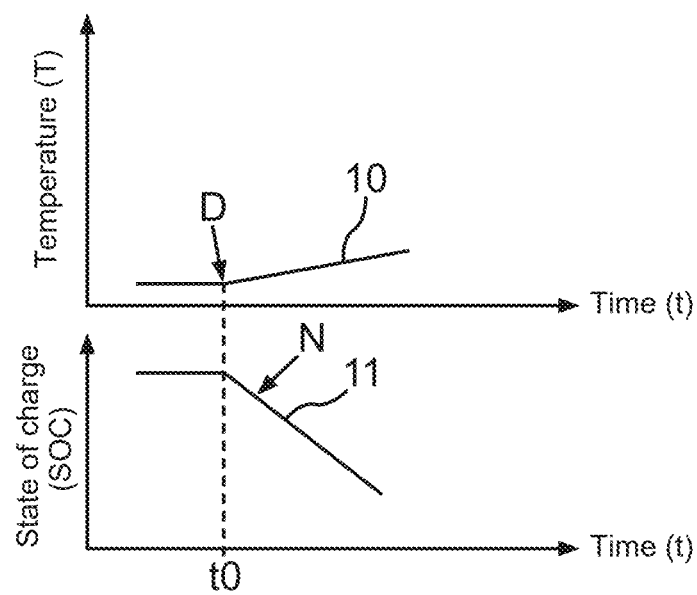
FIG. 5 shows a graphic illustration of the detection of a fault in the temporal context of the initialization of the emergency discharge process according to an exemplary embodiment of the invention.

FIG. 5 again uses second graphic representations to show the temporal relationship between the detection D of the fault and the initialization of the emergency discharge process N. In the upper graphic in FIG. 5, in particular the course 10 of the temperature T of a battery cell 22 as a function of time t is shown. This course 10 begins to rise more quickly at a specific point in time t0. This point in time t0 corresponds to the occurrence of a defect 10a according to the representation in FIG. 1. This faster increase can be detected, so that the detection D of this fault 10a takes place shortly after this point in time t0. The emergency discharge process N is initiated immediately after the detection D of this fault 10a. As a result, the state of charge SOC of the battery 16 or of the at least one battery cell 22 is reduced, as illustrated in the lower graphic in FIG. 5. The emergency discharge process N thus represents the part of the charge state curve 11 which has a negative slope.

Overall, the examples show how the invention can be used to provide a method for limiting damage in the event of a fault in battery cells due to discharge. This can be accompanied by an implementation of an early recognition of battery faults in the battery system, an implementation of a control of the discharge by auxiliary consumers and/or through a bidirectional charging column, as well as the implementation of a warning and deactivation of the readiness to drive.

The invention claimed is:

1. A method for discharging at least one battery cell of a battery for a motor vehicle in an event of at least one specific detected fault concerning the battery, comprising the steps:
   detecting the specific fault; and
   depending on the detection of the fault, initiating an emergency discharge process for at least partially discharging the at least one battery cell;
   wherein the at least one battery cell is at least partially discharged during the emergency discharge process via at least one on-board electrical consumer of the motor vehicle external to the battery and/or a power supply system external to the motor vehicle,
   wherein before the emergency discharge process, a determination is made whether a charger on a vehicle side is coupled to the power supply system, and if the charger is coupled to the power supply system, the emergency discharge process is carried out so that the at least one battery cell is at least partially discharged by the charger by feeding battery current into the power supply system.

2. The method as claimed in claim 1, wherein the on-board electrical consumer represents a high-voltage consumer of a high-voltage on-board electrical system of the motor vehicle, which is operated in an active state to discharge the at least one battery cell with a maximum operating capacity assigned to the high-voltage consumer.

3. The method as claimed in claim 2, wherein the battery current is fed into the power supply system by a charging station which is connected to the power supply system or a wall box to which the charger on the motor vehicle side is coupled.

4. The method as claimed in claim 2, wherein the discharging takes place with a discharge capacity of at least 5 kW.

5. The method as claimed in claim 1, wherein a high-voltage consumer represents an air conditioning device of the motor vehicle.

6. The method as claimed in claim 5, wherein the battery current is fed into the power supply system by a charging station which is connected to the power supply system or a wall box to which the charger on the motor vehicle side is coupled.

7. The method as claimed in claim 5, wherein the discharging takes place with a discharge capacity of at least 5 kW.

8. The method as claimed in claim 1, wherein the battery current is fed into the power supply system by a charging station which is connected to the power supply system or a wall box to which the charger on the motor vehicle side is coupled.

9. The method as claimed in claim 8, wherein the discharging takes place with a discharge capacity of at least 5 kW.

10. The method as claimed in claim 1, wherein the discharging takes place with a discharge capacity of at least 5 kW.

11. The method as claimed in claim 1, wherein an ambient parameter is detected and the emergency discharge process is carried out as a function of the detected ambient parameter.

12. The method as claimed in claim 1, wherein the battery has several battery cells, wherein during the emergency discharge process at least one of the battery cells are at least partially discharged, wherein only one first battery cell causing the fault; and/or at least one battery cell arranged spatially adjacent to the first battery cell; and/or only the battery cells of a first battery module comprising the first battery cell; and/or at least one battery module arranged adjacent to the first battery module.

13. The method as claimed in claim 1, wherein the battery has several battery cells, wherein during the emergency discharge process all of the battery cells are at least partially discharged.

14. The method as claimed in claim 2, wherein the high-voltage consumer represents an air conditioning device of the motor vehicle.

15. A control device for a battery for controlling the discharging of at least one battery cell of the battery in an event of at least one specific detected fault concerning the battery, wherein the control device is designed to trigger an emergency discharge process for at least partially discharging the least one battery cell depending on the detection of the fault;

Wherein the control device is designed to trigger such an emergency discharge process in which the at least one battery cell is at least partially discharged during the emergency discharge process via at least one on-board electrical consumer external to the battery and/or a power supply system external to the motor vehicle, wherein before the emergency discharge process, it is checked whether a charger on the vehicle side is coupled to the power supply system, and if the charger is coupled to the power supply system, the emergency discharge process is carried out in such a way that the at least one battery cell is at least partially discharged by the charger by feeding battery current into the power supply system.

* * * * *